(12) United States Patent
Marshall

(10) Patent No.: US 9,745,152 B2
(45) Date of Patent: Aug. 29, 2017

(54) IMPACT BUFFER

(71) Applicant: CATAC CAPITAL GmbH, Anif (AT)

(72) Inventor: Michael Marshall, Anif (AT)

(73) Assignee: CATAC CAPITAL GMBH (AT)

( * ) Notice: Subject to any disclaimer, the term of this patent is extended or adjusted under 35 U.S.C. 154(b) by 0 days.

(21) Appl. No.: 14/759,518

(22) PCT Filed: Nov. 12, 2013

(86) PCT No.: PCT/EP2013/073570
§ 371 (c)(1),
(2) Date: Jul. 7, 2015

(87) PCT Pub. No.: WO2014/108229
PCT Pub. Date: Jul. 17, 2014

(65) Prior Publication Data
US 2015/0360888 A1    Dec. 17, 2015

(30) Foreign Application Priority Data
Jan. 8, 2013  (DE) .................. 10 2013 000 075

(51) Int. Cl.
| F16F 1/36 | (2006.01) |
| B65G 69/00 | (2006.01) |
| F16F 1/54 | (2006.01) |
| F16F 1/44 | (2006.01) |

(52) U.S. Cl.
CPC ............ B65G 69/001 (2013.01); F16F 1/445 (2013.01); F16F 1/54 (2013.01); F16F 1/36 (2013.01)

(58) Field of Classification Search
CPC ......... F16F 2230/007; F16F 2230/0076; F16F 1/371; F16F 1/3713; F16F 1/3716; F16F 1/3737; F16F 1/3828; F16F 1/40; F16F 1/403; F16F 1/406; F16F 1/44; F16F 1/445; F16F 1/52; F16F 1/54; B60G 69/001; B65G 69/001; E02B 3/26
USPC .................. 267/292, 293, 294, 140
See application file for complete search history.

(56) References Cited

U.S. PATENT DOCUMENTS

| 1,996,512 A | * | 4/1935 | Hirshfeld | B60G 11/22 105/197.05 |
| 3,146,013 A | | 8/1964 | Kappen | |
| 3,853,084 A | * | 12/1974 | Kedar | E02B 3/26 114/219 |
| 4,641,852 A | * | 2/1987 | Kerst | B60D 1/50 280/489 |

(Continued)

FOREIGN PATENT DOCUMENTS

| EP | 1 182 155 | 2/2002 |
| EP | 100 03 744 | 10/2011 |

(Continued)

OTHER PUBLICATIONS

Machine Translation of EP 27423218 (no date).*
International Search Report of Feb. 10, 2014.

*Primary Examiner* — Nicholas J Lane
(74) *Attorney, Agent, or Firm* — Gerald E. Hespos; Michael J. Porco; Matthew T. Hespos

(57) ABSTRACT

An impact buffer has a retaining part for fitting to a loading ramp, a stop part for a vehicle to be loaded at the loading ramp to strike, and a buffer part for cushioning the stop part against the retaining part. The stop part is supported on the retaining part with at least one pivot lever.

6 Claims, 3 Drawing Sheets

(56) References Cited

U.S. PATENT DOCUMENTS

| | | | | |
|---|---|---|---|---|
| 5,658,633 A * | 8/1997 | Di Biase | ............. | B65G 69/001 |
| | | | | 114/219 |
| 6,120,871 A * | 9/2000 | De Biase | ............. | B65G 69/001 |
| | | | | 114/219 |
| 7,950,618 B1 * | 5/2011 | Burer | ................ | B60N 2/42736 |
| | | | | 248/421 |
| 2007/0151819 A1 * | 7/2007 | Schmidt | ............... | B65G 69/008 |
| | | | | 188/377 |
| 2007/0152390 A1 * | 7/2007 | DiBiase | ............... | B65G 69/001 |
| | | | | 267/140 |

FOREIGN PATENT DOCUMENTS

| | | | | |
|---|---|---|---|---|
| EP | 2 604 556 | 6/2013 | | |
| FR | EP 2743218 A1 * | 6/2014 | ........... | B65G 69/001 |
| GB | 716563 A * | 10/1954 | ............... | B60G 3/20 |

\* cited by examiner

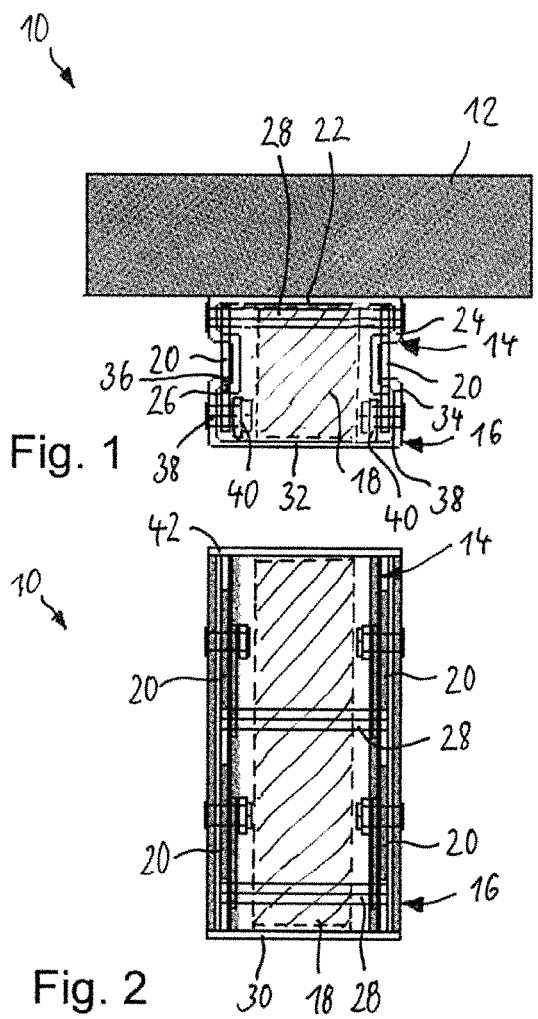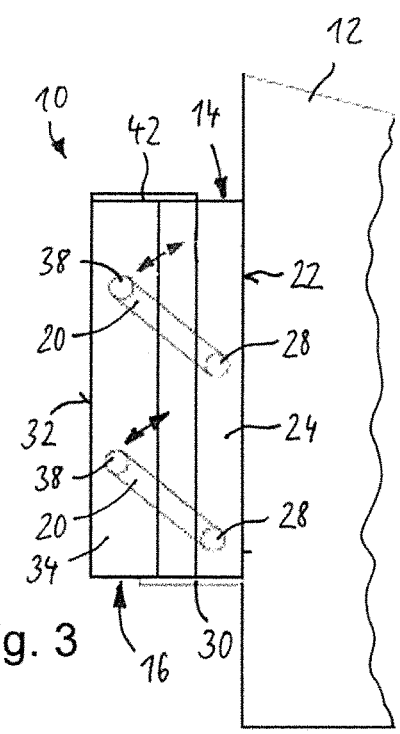

IMPACT BUFFER

BACKGROUND OF THE INVENTION

1. Field of the Invention

The invention relates to an impact buffer for fitting to a loading ramp, having a retaining part for fitting to the loading ramp, having a stop part for a vehicle to be loaded at the loading ramp to strike, and having a buffer part for cushioning a movement by the stop part against the retaining part.

2. Description of the Related Art

When loading and unloading trucks at loading ramps and the like, the truck must drive up close to the loading ramp without damaging the latter. It is therefore known to fit loading ramps with impact buffers that the truck can strike. The impact buffers must cushion the impact of the truck such that the truck is not damaged. Since the number of loading events at such loading ramps is often very, very high, such impact buffers are subject to relatively high wear.

U.S. Pat. No. 5,658,633 A discloses an impact buffer having two shells that are open on one side and whose interior is filled with resilient material. Two cross-members arranged above one another that may move in longitudinal holes across a limited segment prevent the stop part of the impact buffer that assumes the impact load from falling out of a retaining part of the impact buffer that is fitted to the loading ramp. In one alternative design it is prevented from falling out with lateral, vertical lips on the two shells.

EP 1 182 155 A discloses an impact buffer for fitting to loading ramps, dock levelers, and the like, having the following components: a first, sectionally C-profile-shaped, vertically extending part made of hard, impact-resistant material, a second, sectionally hat-profile-shaped, vertically extending part made of hard, impact-resistant material, the lateral flanges of which are arranged in the first part adjacent to its side flanges, and the bars of which extend out of the first part, and a core arranged inside the first and second parts that is made of an elastically deformable damping material, wherein either the first or the second part may be arranged stationary and the other part that absorbs the impact load is movable in the bar direction relative to the part that may be arranged stationary, and wherein the other part that absorbs the impact load is arranged such that it may be moved up and down relative to the part that may be arranged stationary.

The underlying object of the invention is to create an impact buffer of the type specified in the foregoing that has a longer service life compared to known impact buffers.

SUMMARY OF THE INVENTION

This object is attained in accordance with the invention with an impact buffer for fitting to a loading ramp, having a retaining part for fitting to the loading ramp, having a stop part for a vehicle to be loaded at the loading ramp to strike, and having a buffer part for cushioning the stop part against the retaining part, in which the stop part is supported on the retaining part with at least one pivot lever.

In the inventive impact buffer, the stop part is embodied movable relative to the retaining part. The buffer part is disposed between the stop part and the retaining part. In this way, both the buffer part and the stop part are held location-fast or stationary at the loading ramp using the retaining part. When a vehicle strikes the impact buffer, the buffer part may be elastically deformed and thus kinetic energy from the impact or collision of the vehicle converts to internal friction energy. Thus the impact is buffered. In accordance with the invention, the movement of the stop part relative to the retaining part is precisely guided by means of at least one pivot lever or pivot part for the service life of the impact buffer. At the same time, with the at least one pivot lever the stop part is movably retained on the retaining part, and the buffer part is also retained precisely in position between the retaining part and the stop part.

The stop part may be supported on the retaining part with two pivot levers that extend parallel to one another. The retaining part may be embodied longitudinally with two opposing lateral surfaces and two pivot levers that extend parallel to one another are provided on the two lateral surfaces of the retaining part.

In one embodiment, the retaining part and/or the stop part are furthermore embodied with a U-shaped cross-section and the at least one pivot lever is arranged inside the U-shape. Furthermore, the retaining part and the stop part may be embodied in a U-shape and the U-shape of the stop part is embodied overlapping the U-shape of the retaining part.

The stop part may have a cover surface or head surface with which it may be supported suspended on the retaining part. The retaining part advantageously has a bottom surface or base surface with which the buffer part is supported on the retaining part. The buffer part may be embodied in a rectangular shape.

BRIEF DESCRIPTION OF THE DRAWINGS

FIG. 1 is a sectional top view of a first exemplary embodiment of an inventive impact buffer.

FIG. 2 is a sectional front view of the impact buffer in accordance with FIG. 1.

FIG. 3 is a side view of the impact buffer in accordance with FIG. 1.

DETAILED DESCRIPTION

Figure 4:
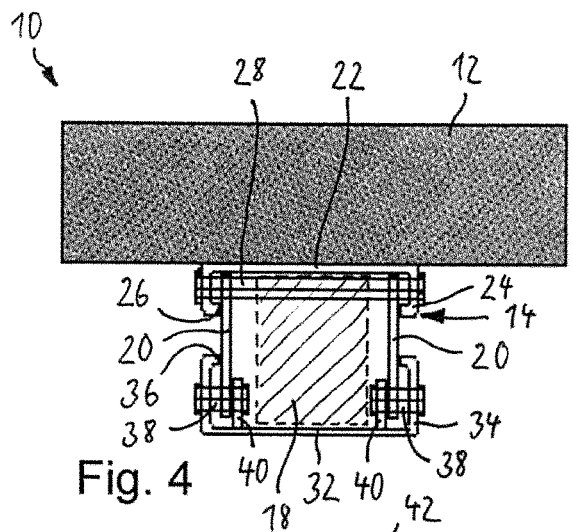
FIG. 4 is a sectional top view of a second exemplary embodiment of an inventive impact buffer.

FIGS. 1 through 9 depict impact buffers 10 in which a retaining part 14 is bolted location-fast to an associated loading ramp 12. A stop part 16 is movably retained on the retaining part 14, wherein disposed between the retaining part 14 and the stop part 16 is a buffer part 18 that may be elastically deformed when a vehicle strikes the impact buffer 10 during a loading or unloading process at the loading ramp 12. During this buffer movement, the stop part 16 is retained and guided on the retaining part 14 by means of a total of four pivot levers 20. The pivot levers 20 is disposed as two lever pairs, whose levers run parallel to one another, on each side of the plate-like retaining part 14 and likewise plate-like stop part 16. The buffer part, which is made of elastic material, especially elastomer, is disposed as an essentially rectangular body in the interior of the arrangement.

Both the retaining part 14 and the stop part 16, seen in cross-section (see FIGS. 1, 4, and 7), are essentially embodied in U-shapes.

The U-shape of the retaining part 14 is formed with a retaining surface 22 that faces the loading ramp 12 and from which a lateral surface 24 projects from each side as a legs. The lateral surfaces 24 in the exemplary embodiments in accordance with FIGS. 1 through 3 are each embodied in an S-shape and thus terminate with a bar section 26 that faces outward. Two bolts 28 pass transversely through the U-shape; on these two of the pivot levers 20 are pivotably borne on the retaining part 14. The retaining part 14 furthermore has a bottom surface 30 on which the buffer part 18 stands and is supported.

The U-shape of the stop part 16 is embodied in a similar matter with a stop surface 32 that extends essentially parallel to the retaining surface 22 and from the sides of which two lateral surfaces 34 project laterally. In the exemplary embodiments in accordance with FIGS. 1 through 3, the lateral surfaces 34 each terminate with an inwardly facing bar section 36 that locks to the associated bar section 26 of the retaining part 14.

Also disposed on the stop part 16 are a total of four bolts 38 that are oriented transverse to the U-shape and each is retained on the stop part 16 by means of a bolt support 40. One of the pivot levers 20 is oriented on an upward incline at an angle of approx. 45° between a bolt support 40 and a lateral surface 34 of the stop part 16 and is pivotably fitted to the stop part 16. This design with bolt supports and associated short bolts that do not completely pass through the U-shape may also be advantageously selected as an alternative for the bolts 28 on the retaining part 14. Furthermore disposed on the stop part 16 is a cover surface 42 with which the stop part 16 is supported suspended on the retaining part 14.

Figure 5:
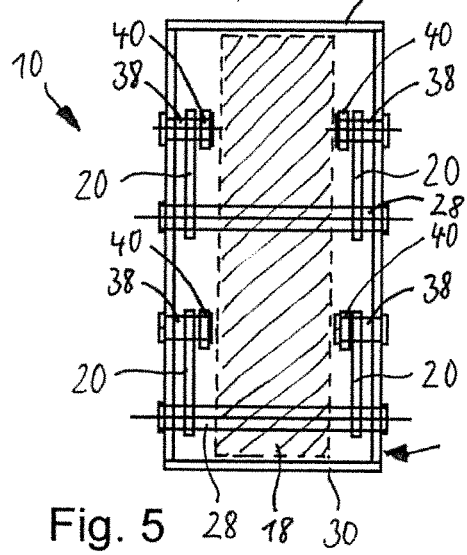
FIG. 5 is a sectional front view of the impact buffer in accordance with FIG. 4.
Figure 6:
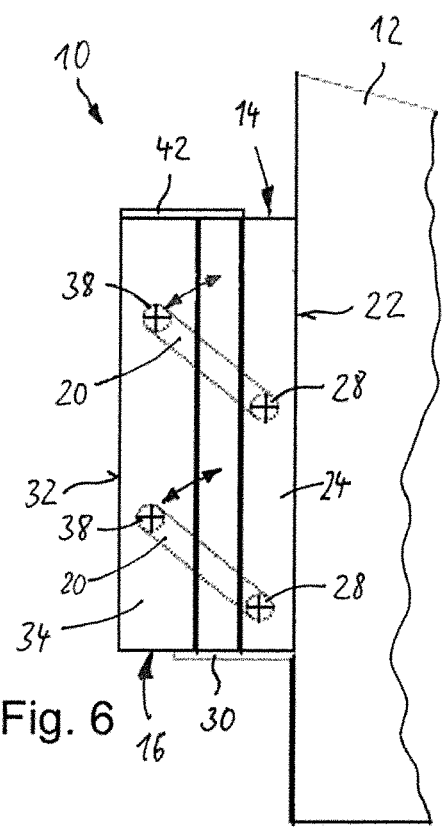
FIG. 6 is a side view of the impact buffer in accordance with FIG. 4.

In the exemplary embodiment in accordance with FIGS. 4 through 6, the lateral surfaces 24 of the retaining part 14 are not S-shaped, but rather are embodied straight with bar sections 26 oriented inward. In this exemplary embodiment, the stop part 16 does not lock to the retaining part 14, but is nevertheless precisely retained and guided thereon by means of the pivot lever 20 and also the cover surface 42.

Figure 7:
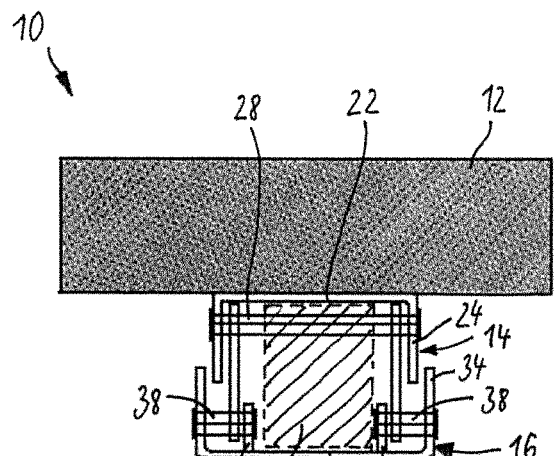
FIG. 7 is a sectional top view of a third exemplary embodiment of an inventive impact buffer.
Figure 8:
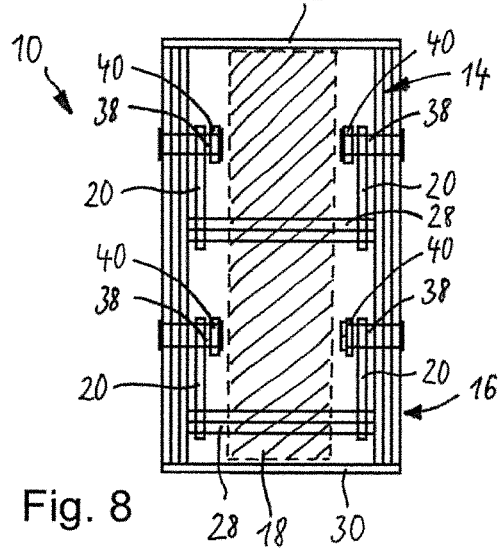
FIG. 8 is a sectional front view of the impact buffer in accordance with FIG. 7.
Figure 9:
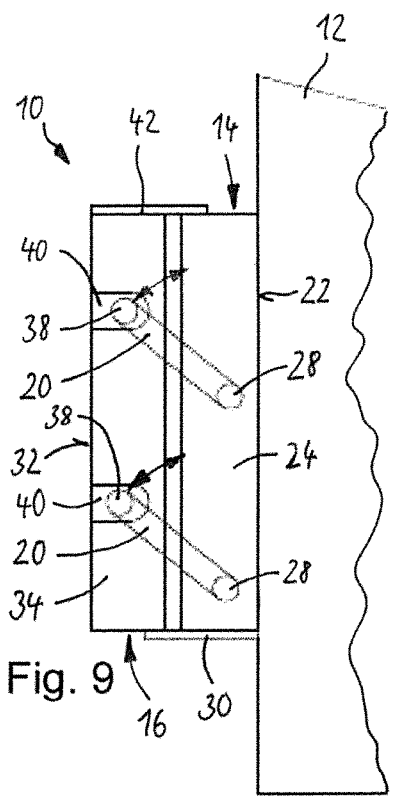
FIG. 9 is a side view of the impact buffer in accordance with FIG. 7.

The exemplary embodiment in accordance with FIGS. 7 through 9 is embodied with lateral surfaces 24 and 34 that are embodied completely straight (that is, without inwardly or outwardly oriented bar sections). The U-shape of the stop part 16 is selected much larger than the U-shape of the retaining part 14 such that the stop part 16 overlaps the retaining part 14.

REFERENCE LIST

10 Impact buffer
12 Loading ramp
14 Retaining part
16 Stop part
18 Buffer part
20 Pivot lever
22 Retaining surface of the retaining part
24 Lateral surface of the retaining part
26 Bar section of the lateral surface of the retaining part
28 Bolt on the retaining part
30 Bottom surface on the retaining part
32 Stop surface of the stop part
34 Lateral surface of the stop part
36 Bar section of the lateral surface of the stop part
38 Bolt on the stop part
40 Bolt support on the stop part
42 Cover surface on the stop part

The invention claimed is:

1. An impact buffer (10) for fitting to a loading ramp (12), comprising:
   a substantially U-shaped retaining part (14) fit to the loading ramp (12), the retaining part having a retaining surface facing the loading ramp and first and second spaced-apart retaining part lateral surfaces extending from the retaining surface and away from the loading ramp;
   a substantially U-shaped stop part (16) movably coupled to the retaining part and configured for contacting a vehicle to be loaded at the loading ramp (12), the stop part having a stop surface substantially parallel to the retaining surface and first and second stop part lateral surfaces extending from the stop surface and towards the loading ramp;
   at least first and second pairs of pivot levers, all of the pivot levers of the first and second pairs of pivot levers extending parallel to one another, each of the pivot levers of the first pair of pivot levers having a first retaining part end pivotably coupled to the first retaining part lateral surface and a first stop part end pivotably coupled to the first stop part lateral surfaces, each of the pivot levers of the second pair of pivot levers having a second retaining part end pivotably coupled to the second retaining part lateral surface and a second stop part end pivotably coupled to the second stop part lateral surfaces; and
   a buffer part (18) disposed between the retaining part and the stop part for cushioning a movement by the stop part (16) against the retaining part, wherein the stop part is retained and guided on the retaining part by the at least first and second pairs of pivot levers.

2. The impact buffer of claim 1, wherein each of the pivot levers (20) is arranged inside the U-shape of at least one of the retaining part and the stop part.

3. The impact buffer of claim 1, wherein the U-shape of the stop part (16) overlaps the U-shape of the retaining part (14).

4. The impact buffer of claim 1, wherein the stop part (16) has a cover surface (42) with which the stop part (16) is supported suspended on the retaining part (14).

5. The impact buffer of claim 1, wherein the retaining part (14) has a bottom surface (30), the buffer part (18) being supported on the bottom surface (30) of the retaining part (14).

6. The impact buffer of claim 1, wherein the buffer part (18) is rectangular.

* * * * *